(12) United States Patent
Chuman

(10) Patent No.: US 10,919,052 B2
(45) Date of Patent: Feb. 16, 2021

(54) SLAG CYCLONE, GASIFICATION EQUIPMENT, GASIFICATION-COMBINED POWER GENERATION EQUIPMENT, METHOD FOR OPERATING SLAG CYCLONE, AND METHOD FOR MAINTAINING SLAG CYCLONE

(71) Applicant: MITSUBISHI HITACHI POWER SYSTEMS, LTD., Yokohama (JP)

(72) Inventor: Fumihiro Chuman, Kanagawa (JP)

(73) Assignee: MITSUBISHI POWER, LTD., Yokohama (JP)

( * ) Notice: Subject to any disclaimer, the term of this patent is extended or adjusted under 35 U.S.C. 154(b) by 167 days.

(21) Appl. No.: 16/074,513

(22) PCT Filed: Feb. 3, 2017

(86) PCT No.: PCT/JP2017/004077
§ 371 (c)(1),
(2) Date: Aug. 1, 2018

(87) PCT Pub. No.: WO2017/138461
PCT Pub. Date: Aug. 17, 2017

(65) Prior Publication Data
US 2019/0039078 A1 Feb. 7, 2019

(30) Foreign Application Priority Data
Feb. 8, 2016 (JP) .............................. JP2016-022096

(51) Int. Cl.
*B04C 5/185* (2006.01)
*B04C 5/085* (2006.01)
(Continued)

(52) U.S. Cl.
CPC .............. *B04C 5/185* (2013.01); *B04C 5/085* (2013.01); *B04C 11/00* (2013.01); *C10J 3/485* (2013.01);
(Continued)

(58) Field of Classification Search
CPC .................................................. B01D 21/267
See application file for complete search history.

(56) References Cited

U.S. PATENT DOCUMENTS 2,901,331 A * 8/1959 Held ...................... B01J 8/0055
422/145
4,247,302 A * 1/1981 Woldy ....................... C10J 3/08
122/7 R
(Continued)

FOREIGN PATENT DOCUMENTS

JP S62-114300 U 7/1987
JP H03-052612 A 3/1991
(Continued)

OTHER PUBLICATIONS

International Search Report dated Apr. 11, 2017, issued in counterpart appplication No. PCT/JP2017/004077, with English translation. (5 pages).
(Continued)

*Primary Examiner* — Matthew J Merkling
(74) *Attorney, Agent, or Firm* — Westerman, Hattori, Daniels & Adrian, LLP

(57) ABSTRACT

There are provided a cyclone body (50) into which a pressurized mixed fluid of slag and water is guided to centrifuge the slag from the water, and a pressure container (51) for housing the cyclone body (50), the cyclone body (50) being provided in its vertically lower portion with an opening (50*d*) that opens in the pressure container (51). The cyclone body (50) is provided in its inner peripheral surface
(Continued)

with an abrasion-resistant material (56). The pressure container (51) includes a slag receiver (51*d*) below the opening (50*d*) of the cyclone body (50) to temporarily store slag.

8 Claims, 11 Drawing Sheets

(51) Int. Cl.
*B04C 11/00* (2006.01)
*F02C 3/28* (2006.01)
*F02C 6/00* (2006.01)
*C10J 3/48* (2006.01)
*C10J 3/72* (2006.01)
*C10J 3/52* (2006.01)
*F01K 23/10* (2006.01)

(52) U.S. Cl.
CPC .......... *C10J 3/52* (2013.01); *C10J 3/721* (2013.01); *F02C 3/28* (2013.01); *F02C 6/00* (2013.01); *C10J 2300/165* (2013.01); *C10J 2300/1675* (2013.01); *F01K 23/10* (2013.01); *F05D 2220/72* (2013.01); *Y02E 20/16* (2013.01); *Y02E 20/18* (2013.01)

(56) References Cited

U.S. PATENT DOCUMENTS

| | | | | |
|---|---|---|---|---|
| 4,248,604 | A * | 2/1981 | Woldy | C10J 3/08 |
| | | | | 122/7 R |
| 4,251,228 | A * | 2/1981 | Muenger | B01D 45/08 |
| | | | | 252/373 |
| 4,289,502 | A * | 9/1981 | Muenger | B01D 45/08 |
| | | | | 122/5 |
| 4,324,563 | A * | 4/1982 | Jones | C10J 3/00 |
| | | | | 422/207 |
| 4,328,006 | A * | 5/1982 | Muenger | B01D 45/08 |
| | | | | 122/5 |
| 4,328,008 | A * | 5/1982 | Muenger | B01D 45/08 |
| | | | | 252/373 |
| 7,081,229 | B2 * | 7/2006 | Huziwara | B01J 8/0055 |
| | | | | 422/144 |
| 2014/0237986 | A1 * | 8/2014 | Tazawa | F02C 3/28 |
| | | | | 60/39.12 |
| 2015/0059661 | A1 | 3/2015 | Yokohama et al. | |
| 2016/0045841 | A1 | 2/2016 | Kaplan et al. | |
| 2018/0362869 | A1 * | 12/2018 | Koyama | C10J 3/466 |

FOREIGN PATENT DOCUMENTS

| | | |
|---|---|---|
| JP | H03-098950 U | 10/1991 |
| JP | H07-007751 U | 2/1995 |
| JP | H08-323242 A | 12/1996 |
| JP | H10-311627 | 11/1998 |
| JP | H11-267438 A | 10/1999 |
| JP | 2003-200040 A | 7/2003 |
| JP | 2003-225514 | 8/2003 |
| JP | 2010-269951 A | 12/2010 |
| JP | 2013-056972 A | 3/2013 |
| JP | 2013-112734 A | 6/2013 |
| JP | 2013-221068 A | 10/2013 |
| JP | 5743093 B2 | 7/2015 |

OTHER PUBLICATIONS

Written Opinion dated Apr. 11, 2017, issued in counterpart application No. PCT/JP2017/004077, with English translation. (18 pages).
Office Action dated May 26, 2020, issued in counterpart JP application No. 2016-022096, with English translation. (14 pages).

\* cited by examiner

SLAG CYCLONE, GASIFICATION EQUIPMENT, GASIFICATION-COMBINED POWER GENERATION EQUIPMENT, METHOD FOR OPERATING SLAG CYCLONE, AND METHOD FOR MAINTAINING SLAG CYCLONE

TECHNICAL FIELD

The present invention is related to a slag cyclone for centrifuging a pressurized mixed fluid of slag and water, gasification equipment, gasification-combined power generation equipment, a method for operating a slag cyclone, and a method for maintaining a slag cyclone.

BACKGROUND ART

Molten slag is produced by combustion of powdered coal and chars in a high temperature gas in a combustor of a coal gasification furnace, and then adheres to a furnace wall and falls through a slag hole into slag cooling water in a slag hopper in a bottom portion. The molten slag is rapidly cooled by slag cooling water to become glass-like granulated slag. The coal gasification furnace includes a pressure container provided at its vertical upper end with an exhaust port for produced gas produced in the gasification furnace, and at its lower end with a slag exhaust port for discharging slag falling into water stored in the slag hopper.

Slag is discharged from the coal gasification furnace. Slurry of slag cooling water and slag is stored in a slag lock hopper, and then is fed into a liberating tank to be centrifuged into the slag cooling water and the slag by the cyclone (e.g., refer to PTL 1).

The slurry supplied is separated into slag cooling water and slag, and the separated slag cooling water is returned into a cooling tank as circulate water. The granulated slag separated is discharged into a slag storage tank.

CITATION LIST

Patent Literature

[PTL 1] the Publication of Japanese Patent No. 5743093

SUMMARY OF INVENTION

Technical Problem

A cyclone for separating slag cooling water (liquid) and slag requires a strong structure having a large thickness as a pressure container to receive slurry of slag cooling water and slag, under high pressure. The cyclone needs to be maintained at high frequency due to severe abrasion caused by glass-like slag.

Unfortunately, the cyclone provided has a strong structure having a large thickness as a pressure container, so that maintenance at high frequency may be hindered.

Even when the cyclone is protected by using an abrasion resistance material, reduction in weight of a cyclone body is desired to facilitate replacement thereof when its abrasion becomes severe.

The present invention is made in light of the above-mentioned circumstances, and an object thereof is to provide a slag cyclone, gasification equipment, gasification-combined power generation equipment, a method for operating a slag cyclone, and a method for maintaining a slag cyclone, being capable of reducing weight of a cyclone body and facilitating maintenance even when a pressurized mixed fluid of slag and liquid (cooling water) is centrifuged.

Solution to Problem

To solve the problem described above, a slag cyclone, gasification equipment, gasification-combined power generation equipment, a method for operating a slag cyclone, and a method for maintaining a slag cyclone, of the present invention, employ the following means.

That is, the slag cyclone according to the present invention includes a cyclone body into which a pressurized mixed fluid of slag and liquid is guided to centrifuge the slag from the liquid, and a pressure container for housing the cyclone body, the cyclone body being provided in its vertically lower portion with a slag exhaust port opening in the pressure container.

A pressurized mixed fluid of slag and water is guided into the cyclone body housed in the pressure container, so that the slag is centrifuged from the water. The centrifuged slag is discharged from the slag exhaust port. The slag exhaust port opens in the pressure container to allow the inside and the outside of the cyclone body to communicate with each other, so that the inside and the outside of the cyclone body have substantially identical pressure. Accordingly, there is no large difference in pressure inside and outside the cyclone body, so that the cyclone body does not need to employ a pressure-resistant structure. This enables the cyclone body to be reduced in thickness as well as in weight and cost even when a pressurized mixed fluid is centrifuged. The cyclone body is reduced in weight as described above, so that operation of replacing the cyclone body at maintenance is facilitated.

The pressurized mixed fluid of slag and water is set at a pressure of several MPa, for example.

In addition, in the slag cyclone of the present invention, the cyclone body has an inner peripheral surface to which abrasion-resistant material is applied.

The inner peripheral surface of the cyclone body is worn due to collision of slag. Thus, the abrasion-resistant material is applied to the inner peripheral surface of the cyclone body. As the abrasion-resistant material, a basalt material, ceramics, abrasion-resistant material cladding, abrasion-resistant casting iron, or the like is available, for example.

Slag density increases toward the slag exhaust port of the cyclone body to cause severe abrasion, so that it is preferable to apply a thicker abrasion-resistant material to a region closer to the slag exhaust port (e.g., a lower portion when the slag exhaust port is positioned at an lower end) than other regions.

In addition, in the slag cyclone of the present invention, the pressure container includes a slag receiver for temporarily storing slag, provided vertically below the slag exhaust port of the cyclone body.

When the slag receiver is provided integrally with the pressure container, slag discharged from the slag exhaust port by gravity can be temporarily stored. This eliminates the need to provide a bottle for temporarily storing slag outside the pressure container to cause structure to be simple.

The slag cyclone of the present invention further includes a slag-discharge lock hopper for receiving slag from the slag receiver, provided below the pressure container, a pressurized-side on-off valve provided between the slag-discharge lock hopper and the slag receiver, and an atmosphere-side on-off valve provided between the slag discharge lock hopper and a transfer destination on an atmosphere side.

When the pressurized-side on-off valve is opened and the atmosphere-side on-off valve is closed, slag is guided into the slag discharge lock hopper from the slag receiver.

When the atmosphere-side on-off valve is opened and the pressurized-side on-off valve is closed, slag is discharged to an apparatus on the atmosphere side from the slag discharge lock hopper.

When the slag-discharge lock hopper is provided below the pressure container, slag stored in the slag receiver under pressure can be discharged into an outlet port on the atmosphere side with the slag-discharge lock hopper.

In addition, the slag cyclone of the present invention includes the cyclone body that is supported by being suspended from the pressure container with a plurality of suspenders.

The cyclone body is supported by being suspended from the pressure container with the suspenders (e.g. suspending bars), so that the cyclone body can be easily removed to the outside of the pressure container with a suspender of a crane.

When the cyclone body is removed, the cyclone body may be suspended by a crane or the like by using the suspenders themselves, or the cyclone body may be suspended by hooking a suspender of the crane to hookers (e.g., lugs or the like) provided in the cyclone body, separate from the suspenders, to be used for removal.

The slag cyclone of the present invention further includes a support equipment which is provided between the cyclone body and the pressure container to define a horizontal position of the cyclone body.

The support equipment is provided between the cyclone body and the pressure container to define a horizontal position of the cyclone body, so that a horizontal position of the cyclone body suspended from the pressure container can be accurately defined to enable a central axis of the cyclone body to align in a vertical direction, for example. The support equipment also can reduce horizontal vibration of the cyclone body.

The slag cyclone of the present invention further includes a mixed-fluid feeding pipe for guiding the mixed fluid into the cyclone body, and the mixed-fluid feeding pipe is detachably inserted into the pressure container and the cyclone body from the outside of the pressure container.

The mixed-fluid feeding pipe is detachably inserted into the pressure container and the cyclone body, so that the mixed-fluid feeding pipe can be easily separated from the cyclone body by pulling the mixed-fluid feeding pipe from the cyclone body to remove the cyclone body from the pressure container for maintenance.

The mixed-fluid feeding pipe also can be inserted from the outside of the pressure container to improve workability when being assembled.

It is further preferable to seal the pressure container with a flange part or the like outside the pressure container. This enables assembly and sealing to be performed at the same time outside the pressure container to further improve workability.

Gasification equipment of the present invention includes a gasification furnace apparatus that produces produced gas by using combustion and gasification of carbon-containing solid fuel, and any one of the slag cyclones described above that centrifuges slag produced by the gasification furnace apparatus from liquid.

The gasification equipment includes one of the slag cyclones, so that gasification equipment excellent in maintenance of a slag cyclone can be provided.

Gasification-combined power generation equipment of the present invention includes a gasification furnace apparatus that produces produced gas by using combustion and gasification of carbon-containing solid fuel, any one of the slag cyclones described above that centrifuges slag produced by the gasification furnace apparatus from liquid, a gas turbine that is rotationally driven by burning at least a part of the produced gas produced by the gasification furnace apparatus, a steam turbine that is rotationally driven by steam including steam produced by an exhaust heat recovery boiler for receiving turbine exhaust gas discharged from the gas turbine, and a generator coupled to the gas turbine and the steam turbine.

A method for operating a slag cyclone, of the present invention, includes the steps of: injecting a pressurized mixed fluid of slag and liquid into a cyclone body housed in a pressure container to centrifuge the pressurized mixed fluid; and discharging centrifuged slag into the pressure container from a slag exhaust port of the cyclone body.

A pressurized mixed fluid of slag and water is guided into the cyclone body housed in the pressure container, so that the slag is centrifuged from the water. The centrifuged slag is discharged into the pressure container from the slag exhaust port. The slag exhaust port opens in the pressure container to allow the inside and the outside of the cyclone body to communicate with each other, so that the inside and the outside of the cyclone body have substantially identical pressure. Accordingly, there is no large difference in pressure inside and outside the cyclone body, so that the cyclone body does not need to employ a pressure-resistant structure. This enables the cyclone body to be reduced in thickness as well as in weight and cost even when a pressurized mixed fluid is centrifuged. The cyclone body is reduced in weight as described above, so that operation of replacing the cyclone body at maintenance is facilitated.

The pressurized mixed fluid of slag and water is set at a pressure of several MPa, for example.

A method for maintaining a slag cyclone, of the present invention, is a method for maintaining a slag cyclone including a cyclone body into which a pressurized mixed fluid of slag and liquid is guided to centrifuge the slag from the liquid, and a pressure container for housing the cyclone body, the cyclone body having a slag exhaust port opening in the pressure container, the method including the steps of: opening a vertically upper portion of the pressure container; suspending the cyclone body with a suspender; and removing the cyclone body suspended with the suspender to the outside of the pressure container.

The cyclone body can be removed from the pressure container by suspending the cyclone body from vertically above the pressure container to enable maintenance to be facilitated.

Advantageous Effects of Invention

The cyclone body is configured to be housed in the pressure container not to apply a large difference in pressure between the inside and the outside of the cyclone body, so that the cyclone body can be reduced in weight even when a pressurized mixed fluid of slag and water is centrifuged, thereby facilitating maintenance.

DESCRIPTION OF EMBODIMENTS

Hereinafter, an embodiment according to the present invention will be described with reference to the accompanying drawings.

Figure 6:
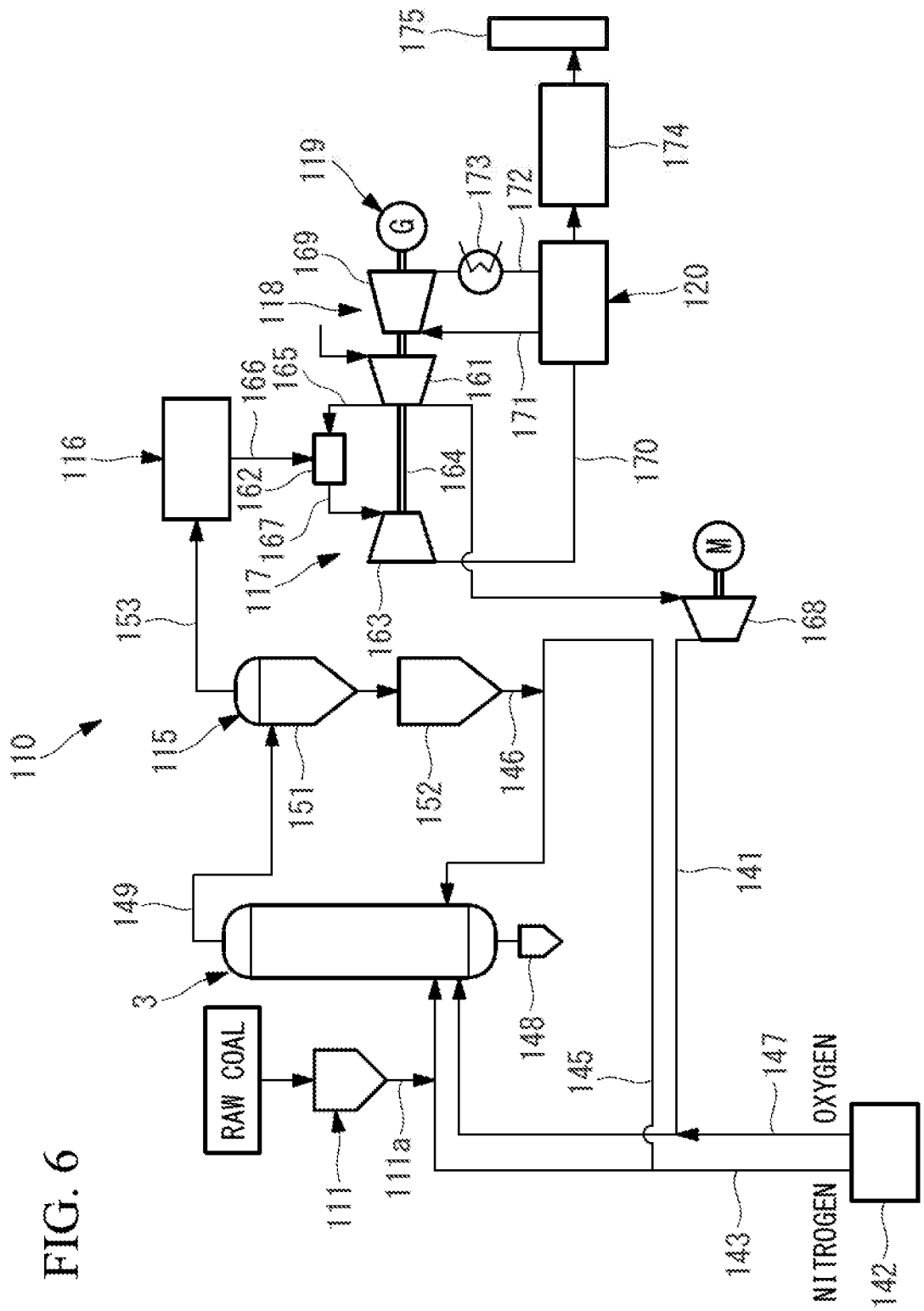
FIG. 6 is a schematic structural view illustrating coal gasification-combined power generation equipment to which a slag cyclone according to an embodiment of the present invention is applied.

FIG. 6 illustrates coal gasification-combined power generation equipment to which a gasification furnace apparatus according to the present embodiment of the present invention is applied.

Coal gasification-combined power generation equipment (integrated coal gasification combined cycle (IGCC)) 110 to which a gasification furnace 3 according to the present embodiment is applied uses air as an oxidant, and an air combustion method for producing produced gas from fuel is employed in the gasification furnace 3. The coal gasification-combined power generation equipment 110 causes a gas purification apparatus 116 to purify produced gas produced in the gasification furnace 3 to produce fuel gas, and then the fuel gas is supplied to gas turbine equipment 117 to generate electric power. That is, the coal gasification-combined power generation equipment 110 is power generation equipment of an air combustion method (air blown). Carbon-containing solid fuel such as coal is used as fuel to be supplied to the gasification furnace 3, for example.

Figure 1:
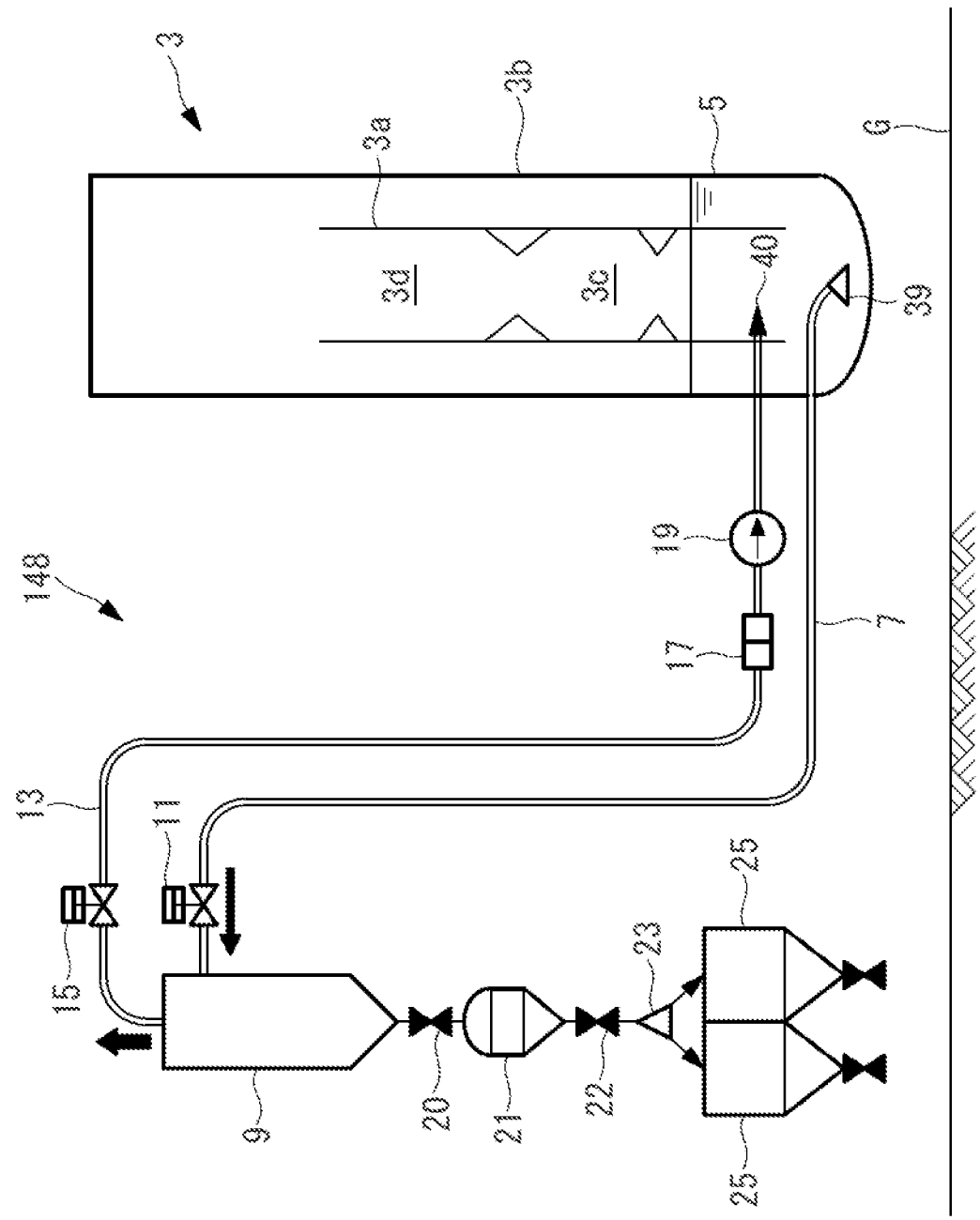
FIG. 1 is a schematic structural view illustrating gasification equipment of integrated coal gasification combined cycle (IGCC) to which a slag cyclone according to an embodiment of the present invention is applied.

The coal gasification-combined power generation equipment (gasification-combined power generation equipment) 110 includes a coaling apparatus 111, the gasification furnace 3, a char recovery apparatus 115, a gas purification apparatus 116, the gas turbine equipment 117, steam turbine equipment 118, a generator 119, and an exhaust heat recovery boiler (heat recovery steam generator (HRSG)) 120, as illustrated in FIG. 1.

Coal being carbon-containing solid fuel is supplied to the coaling apparatus 111 as raw coal, and the coal is pulverized by using a coal mill (not illustrated) or the like to manufacture powdered coal acquired by pulverizing the coal into fine particulates. The powdered coal manufactured by the coaling apparatus 111 is pressurized by using nitrogen gas supplied from an air separate apparatus 142 described below as feeding inert gas, and then is supplied to the gasification furnace 3. The inert gas has an oxygen content of about 5 volume % or less, representatively including nitrogen gas, carbon dioxide gas, argon gas, and the like, and the oxygen content is not necessarily limited to about 5 volume % or less.

To the gasification furnace 3, the powdered coal manufactured by the coaling apparatus 111 is supplied, and char (unreacted coal and ash content) recovered by the char recovery apparatus 115 is returned and supplied to be reusable.

The gasification furnace 3 is connected to a compressed air supply line 141 from the gas turbine equipment 117 (compressor 161), so that a part of compressed air compressed by the gas turbine equipment 117 can be supplied to the gasification furnace 3. The air separate apparatus 142 produces nitrogen and oxygen by separating atmospheric air, and is connected to the gasification furnace 3 with a first nitrogen supply line 143. The first nitrogen supply line 143 is connected to a coaling line 111a from the coaling apparatus 111. The gasification furnace 3 is also connected to a second nitrogen supply line 145 branching from the first nitrogen supply line 143, and the second nitrogen supply line 145 is connected to a char return line 146 from the char recovery apparatus 115. The air separate apparatus 142 is also connected to the compressed air supply line 141 with an oxygen supply line 147. Nitrogen separated by the air separate apparatus 142 flows through the first nitrogen supply line 143 and the second nitrogen supply line 145 to be used as feeding gas for coal and char. Oxygen separated by air separate apparatus 142 flows through the oxygen supply line 147 and the compressed air supply line 141 to be used as oxidant in the gasification furnace 3.

The gasification furnace 3 has a gasification furnace of a two-stage entrained bed type, for example. The gasification furnace 3 partially burn coal (powdered coal) and char, supplied thereinto, using oxidant (air and oxygen) to gasify the coal to produce combustible gas. The gasification furnace 3 includes a foreign matter removing apparatus 148 for removing foreign matters (slag) contaminated into powdered coal. The gasification furnace 3 is connected to a gas producing line 149 for supplying combustible gas to the char recovery apparatus 115, so that combustible gas containing char can be discharged. In this case, the gas producing line 149 may be provided with a syngas cooler (gas cooler) to cool combustible gas to a predetermined temperature to supply it to the char recovery apparatus 115.

The char recovery apparatus 115 includes a cinder catcher 151 and a supply hopper 152. In this case, the cinder catcher 151 is composed of one or more cyclones or porous filters, so that char contained in combustible gas produced by the gasification furnace 3 can be separated. The combustible gas from which char is separated is fed to the gas purification apparatus 116 through a gas discharge line 153. The supply hopper 152 stores char separated from combustible gas by the cinder catcher 151. Between the cinder catcher 151 and the supply hopper 152, a bottle may be disposed so as to be connected to a plurality of the supply hoppers 152. The char return line 146 from the supply hopper 152 is connected to the second nitrogen supply line 145.

The gas purification apparatus 116 removes impurities such as a sulfur compound and a nitrogen compound from combustible gas from which char is separated by the char recovery apparatus 115 to purify the combustible gas. The gas purification apparatus 116 manufactures fuel gas by purifying the combustible gas, and supplies the fuel gas to the gas turbine equipment 117. The combustible gas from which char is separated still contains sulfur contents (H2S, etc.), so that the gas purification apparatus 116 removes and recovers sulfur contents using amine absorbing liquid to effectively use the sulfur contents.

The gas turbine equipment 117 includes a compressor 161, a combustion device 162, and a turbine 163, and the compressor 161 and the turbine 163 are coupled to each other by a rotating shaft 164. The combustion device 162 is connected to not only a compressed air supply line 165 from the compressor 161, but also a fuel gas supply line 166 from the gas purification apparatus 116, and a combustion gas supply line 167 extending toward the turbine 163. The gas turbine equipment 117 is provided with the compressed air supply line 141 extending from the compressor 161 to the gasification furnace 3, and a booster 168 is provided in an intermediate portion of the compressed air supply line 141. The combustion device 162 generates combustion gas by mixing and burning a part of compressed air supplied from the compressor 161 and at least a part of fuel gas supplied from the gas purification apparatus 116, and supplies the generated combustion gas to the turbine. The turbine 163 then rotationally drives the rotating shaft 164 using the combustion gas supplied to rotationally drive the generator 119.

The steam turbine equipment 118 includes a turbine 169 that is coupled to the rotating shaft 164 of the gas turbine equipment 117, and the generator 119 is coupled to a base end of the rotating shaft 164. The exhaust heat recovery boiler 120 is connected to an exhaust gas line 170 from the gas turbine equipment 117 (turbine 163), and produces steam by exchanging heat between feed water and exhaust gas. Between the exhaust heat recovery boiler 120 and the turbine 169 of the steam turbine equipment 118, a steam supply line 171 and a steam recovery line 172 are provided. The steam recovery line 172 is provided with a condenser 173. The steam produced by the exhaust heat recovery boiler 120 may contain steam produced by exchanging heat with produced gas in the syngas cooler, being further exchanged for heat by the exhaust heat recovery boiler 120. Thus, in the steam turbine equipment 118, the turbine 169 is rotationally driven by using steam supplied from the exhaust heat recovery boiler 120, and the generator 119 is rotationally driven by rotationally driving the rotating shaft 164.

Between an outlet port of the exhaust heat recovery boiler 120 and a smokestack 175, a purification apparatus 174 is provided.

Next, operation of the coal gasification-combined power generation equipment 110 with the structure described above will be described.

In the coal gasification-combined power generation equipment 110 of the present embodiment, when raw coal (coal) is supplied to the coaling apparatus 111, the coal is pulverized into fine particulates by the coaling apparatus 111 to be powdered coal. The powdered coal manufactured by the coaling apparatus 111 flows through the first nitrogen supply line 143, using nitrogen supplied from the air separate apparatus 142, to be supplied to the gasification furnace 3. Char recovered by the char recovery apparatus 115 described below flows through the second nitrogen supply line 145, using nitrogen supplied from the air separate apparatus 142, to be supplied to the gasification furnace 3. Compressed air bled from the gas turbine equipment 117 described below is increased in pressure in the booster 168, and then is supplied to the gasification furnace 3, together with oxygen supplied from the air separate apparatus 142, through the compressed air supply line 141.

The gasification furnace 3 produces combustible gas (produced gas) by burning supplied powdered coal and char using compressed air (oxygen) to gasify the powdered coal and char. The combustible gas flows from the gasification furnace 3 through the gas producing line 149 to be discharged and fed to the char recovery apparatus 115.

In the char recovery apparatus 115, the combustible gas is first supplied to the cinder catcher 151 so that particulate char contained in the combustible gas is separated. The combustible gas from which char is separated is fed to the gas purification apparatus 116 through the gas discharge line 153. Meanwhile, particulate char separated from the combustible gas is deposited in the supply hopper 152, and is returned to the gasification furnace 3 through the char return line 146 to be recycled.

The gas purification apparatus 116 performs gas purification on the combustible gas from which char is separated by the char recovery apparatus 115 by removing impurities such as a sulfur compound and a nitrogen compound to manufacture fuel gas. The compressor 161 produces compressed air to be supplied to the combustion device 162. The combustion device 162 produces combustion gas by mixing and burning compressed air supplied from the compressor 161 and fuel gas supplied from the gas purification apparatus 116. The combustion gas causes the turbine 163 to be rotationally driven to rotationally drive the compressor 161 and the generator 119 by using the rotating shaft 164. This enables the gas turbine equipment 117 to generate electric power.

The exhaust heat recovery boiler 120 produces steam by exchanging heat between exhaust gas discharged from the turbine 163 in the gas turbine equipment 117 and feed water, and supplies the produced steam to the steam turbine equipment 118. In the steam turbine equipment 118, the turbine 169 is rotationally driven by using the steam supplied from the exhaust heat recovery boiler 120 to rotationally drive the generator 119 with the rotating shaft 164 to enable power generation.

The gas turbine equipment 117 and the steam turbine equipment 118 may not have the same shaft to rotationally drive the generator 119, and may have respective shafts to rotationally drive a plurality of generators.

After that, the gas purification apparatus 174 removes deleterious materials in exhaust gas discharged from the exhaust heat recovery boiler 120, and the purified exhaust gas is discharged to the atmosphere from the smokestack 175.

Next, the foreign matter removing apparatus 148 illustrated in FIG. 6 will be described in detail.

The gasification furnace 3 includes an inner container (gasification furnace wall) 3a, and an outer container (gasification furnace pressure container) 3b surrounding the periphery of the inner container 3a. The outer container 3b is formed to be a pressure container, and has an internal pressure of several MPa, for example.

The inner container 3a includes a combustor 3c that burns a part of powdered coal to acquire the amount of heat required for gasification reaction, and a reductor 3d that gasifying powdered coal by acquiring the amount of heat from the combustor 3c, the combustor 3c and the reductor 3d being disposed in two tiers.

The gasification furnace 3 is provided in its bottom portion with a slag hopper 5, as illustrated in FIG. 1. The slag hopper 5 stores cooling water (liquid) therein, and the combustor 3c and the reductor 3d receive slag generated from powdered coal.

The slag hopper 5 is connected to a slag discharge line (mixed-fluid feeding pipe) 7 for discharged slag received in the slag hopper 5 to the outside of the system of the gasification furnace 3. The slag discharge line 7 is provided at its upstream end with a slag intake 39 so as to suck slag in the slag hopper 5, together with cooling water. The slag discharge line 7 is connected at its downstream end to the slag cyclone 9. The slag cyclone 9 centrifuges the cooling water and the slag. The slag discharge line 7 is provided in its intermediate position with a slag cyclone inlet valve 11.

The slag cyclone 9 is disposed laterally to the gasification furnace 3, and disposed at a position vertically higher than the bottom portion (the bottom portion of the slag hopper 5) of the gasification furnace 3. That is, the slag cyclone 9 is not disposed immediately below the gasification furnace 3. This enables equipment including the gasification furnace 3 and the slag cyclone 9 to be reduced in height.

The slag cyclone 9 is provided in its lower portion or on its downstream side with a slag discharge lock hopper 21 with a slag cyclone outlet valve (pressurized-side on-off valve) 20 provided therebetween. The slag discharge lock hopper 21 is provided in its vertically lower portion or on its downstream side with a slag discharge lock hopper outlet valve (atmosphere-side on-off valve) 22.

Use of the slag cyclone outlet valve 20 and the slag discharge lock hopper outlet valve 22 enables slag to be discharged to slag fed equipment under normal pressure (atmospheric pressure), downstream from the slag discharge lock hopper 21, from the slag discharge lock hopper 21 after the slag discharge lock hopper 21 receives slag from the slag cyclone 9 under pressure.

Between the slag cyclone 9 and the slag hopper 5, a water injection line 13 is connected. The water injection line 13 allows cooling water centrifuged by the slag cyclone 9 to be returned to the slag hopper 5 to be injected from a water outlet 40. The water injection line 13 is provided in its intermediate portion with a slag hopper water injection valve 15, a strainer 17 for removing foreign matters from cooling water, and a water injection pump 19 for feeding cooling water into the slag hopper 5, in order from upstream of a flow of cooling water. When the water injection pump 19 feeds cooling water into the slag hopper 5 as described above, a flow of cooling water toward the slag cyclone 9 is formed in the slag discharge line 7.

There are provided a distributor 23 and a spin tub 25 with the slag discharge lock hopper outlet valve 22 provided downstream of the slag discharge lock hopper 21. Slag stored in the spin tub 25 is transported to another slag treatment equipment by using a vehicle or the like.

Each valve like the slag cyclone outlet valve 20, the slag discharge lock hopper outlet valve 22, and the like, and each apparatus like the water injection pump 19, and the like, are controlled for operation by a control unit (not illustrated).

The control unit is composed of a central processing unit (CPU), a random access memory (RAM), a read only memory (ROM), a computer readable recording medium, and the like, for example. Then, a series of processes for implementing various functions is stored in a recording medium or the like in the form of a program, for example. When the program is read out to the RAM or the like by the CPU to perform processing of information and arithmetic processing, the various functions are implemented. The program may be used in the following forms of: preliminarily being installed in a ROM or another recording medium: being provided by being stored in a computer-readable recording medium: and being delivered via a wired or wireless communication means. The computer-readable recording medium includes a magnetic disk, a magneto-optical disk, a CD-ROM, a DVD-ROM, a semiconductor memory, and the like.

While FIG. 1 does not illustrate a support structure between the gasification furnace 3, the slag cyclone 9, or the like, and an installation face G, the support structure is eliminated for easy understanding. As a matter of course, the gasification furnace 3, the slag cyclone 9, and the like are actually supported on the installation face G by using respective support structures.

Figure 2:
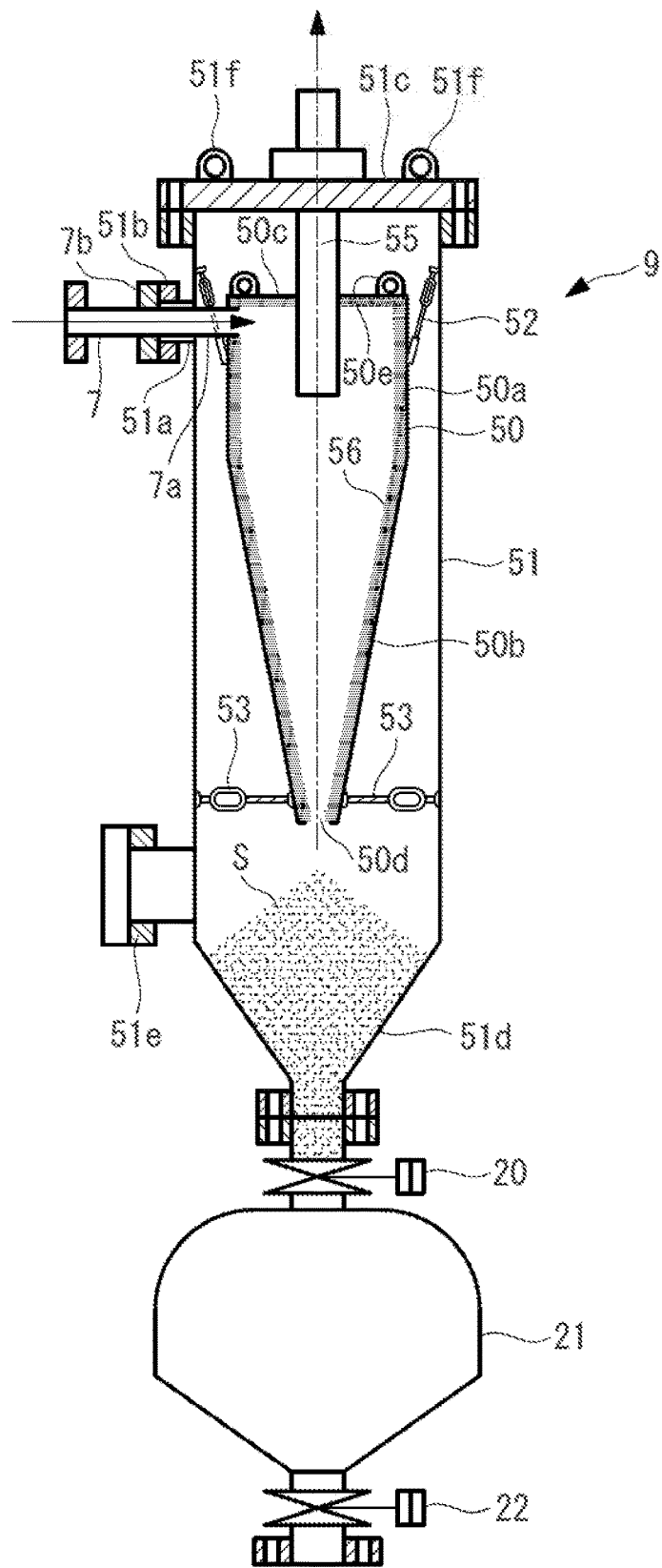
FIG. 2 is a longitudinal sectional view illustrating a slag cyclone according to an embodiment of the present invention.

FIG. 2 illustrates a specific structure of the slag cyclone 9.

The slag cyclone 9 includes a cyclone body 50, a pressure container 51 that houses the entire cyclone body 50. In this way, the pressure container 51 serving as an outer cylinder and the cyclone body 50 serving as an inner cylinder form a double structure.

The cyclone body 50 is a cylinder in a hollow shape, extending vertically along its central axis. The cyclone body 50 includes a tube portion 50a in a cylindrical shape, and a taper portion 50b in a truncated conical shape tapering downward, being connected to a lower end of the tube portion 50a.

The tube portion 50a of the cyclone body 50 has a sidewall into which a downstream end 7a of the slag discharge line 7 is detachably inserted and fixed while maintaining sealability so as to prevent a mixed fluid of slag and cooling water from leaking. The slag discharge line 7 allows a mixed fluid of slag and cooling water to be injected into the cyclone body 50 through an opening of the downstream end 7a, and the mixed fluid is whirled about the central axis of the cyclone body 50 to centrifuge slag and cooling water.

On an upstream side of the slag discharge line 7 near the downstream end 7a thereof, a connecting flange 7b is fixed. The pressure container 51 is provided in its side portion with a connecting pipe 51a provided so as to cover an outer periphery of the slag discharge line 7, the connecting pipe 51a being provided at its end with a connecting flange 51b corresponding to the connecting flange 7b. When these connecting flanges 7b and 51b are connected to each other, the slag discharge line 7 is sealed for the pressure container 51 in a liquid-tight condition.

In the periphery of the tube portion 50a of the cyclone body 50, an end of each of a plurality of suspenders 52 is fixed with a bolt, by welding, or the like. The suspenders 52 each include a suspending bar, and a turnbuckle, for example, and are configured to be adjustable in overall length by turning the turnbuckle around the suspending bar. Each of the suspenders 52 is fixed at its other end to an inner wall of the pressure container 51 with a bolt or the like. The suspenders 52 suspend the cyclone body 50 from the pressure container 51, and are preferably adjusted such that the central axis of the cyclone body 50 aligns with the axis of the pressure container 51.

The tube portion 50a of the cyclone body 50 is connected at its upper portion to a cooling water outlet pipe 55. The cooling water outlet pipe 55 is connected on its downstream side to the water injection line 13 (refer to FIG. 1). The cooling water outlet pipe 55 has a lower end (upstream end) opening in the cyclone body 50, and cooling water separated from slag in the cyclone body 50 is sucked by operation of the water injection pump 19 (refer to FIG. 1). The cooling water outlet pipe 55 is fixed to an upper end 50c of the cyclone body 50. The cooling water outlet pipe 55 is disposed on the central axis of the cyclone body 50, and extends to the outside through an upper lid 51c of the pressure container 51. A gap between the cooling water outlet pipe 55 and the upper lid 51c is liquid-tightly sealed.

The cyclone body 50 is provided in its upper end 50c with a plurality of lugs 50e serving as hookers. At maintenance, suspenders suspended from a crane hook the corresponding lugs 50e.

The taper portion 50b of the cyclone body 50 has a lower end portion to which one end of each of a plurality of support equipment 53 is fixed with a bolt or the like. The support equipment 53 each include a support bar, and a turnbuckle, for example, and are configured to be adjustable in overall length by turning the turnbuckle around the support bar. Each of the support equipment 53 is fixed at its other end to an inner wall of the pressure container 51 with a bolt or the like. The support equipment 53 support the cyclone body 50 to the pressure container 51, and their horizontal positions are preferably defined such that the central axis of the cyclone body 50 aligns with the vertical direction. When the support equipment 53 support the lower end portion of the cyclone body 50, horizontal vibration of the cyclone body 50 can be reduced.

The taper portion 50b of the cyclone body 50 is provided at its lower end with an opening (slag exhaust port) 50d opening toward the inside of the pressure container 51. Slag centrifuged in the cyclone body 50 is discharged vertically downward by gravity through the opening 50d. As described above, the opening 50d of the cyclone body 50 opens in the pressure container 51 to allow the inside and the outside of the cyclone body 50 to communicate with each other, so that there is no large difference in pressure inside and outside the cyclone body 50. This makes it unnecessary that the cyclone body 50 has a large thickness as a pressure-resistant structure to bear a large differential pressure.

The cyclone body 50 is provided on its inner peripheral surface with an abrasion-resistant material 56 for severe abrasion caused by collision of glass-like slag to prolong the life of the cyclone body 50 and increase time to maintenance. The abrasion-resistant material 56 may be provided in the entire region of the inner peripheral surface of the cyclone body 50, and is preferably provided particularly in a portion with severe abrasion due to slag. For example, slag density increases toward the opening 50d of the cyclone body 50 to cause severe abrasion, so that it is preferable to apply a thicker abrasion-resistant material to a region closer to the opening 50d (further vertically downward) than other regions.

As the abrasion-resistant material, a basalt material, ceramics, abrasion-resistant material cladding, abrasion-resistant casting iron, or the like is available, for example. The basalt material uses a particularly hard composition (main chemical compositions are $SiO_2$ and $Al_2O_3$) in basalt belonging to basic igneous rock, as raw material, and has excellent hardness and abrasion-resistance.

The pressure container 51 is in a substantially cylindrical shape, has a pressure-resistant structure capable of bearing a pressurized state under a pressure of several MPa, for example. The central axis of the pressure container 51 preferably aligns with the central axis of the cyclone body 50. However, the central axis of the pressure container 51 is not limited to this.

The lower end portion of the pressure container 51 is in a truncated conical shape tapering downward, and serves as a slag receiver 51d for temporarily storing slag discharged from the opening 50d of the cyclone body 50. As described above, the slag receiver 51d is formed integrally with the pressure container 51. FIG. 2 illustrates slag S that is temporarily stored in the slag receiver 51d.

The slag receiver 51d is connected at its lower end to the slag discharge lock hopper 21 with the slag cyclone outlet valve 20 provided therebetween, described with reference to FIG. 1.

The pressure container 51 is provided in its side portion with a manhole part 51e. The manhole part 51e is opened at maintenance to allow an operator to enter the pressure container. Thus, the manhole part 51e is closed during operation, as illustrated in FIG. 2.

The upper lid 51c that closes an upper end of the pressure container 51 is detachably fixed to a body of the pressure container 51 with a flange. The upper lid 51c is provided in its top surface with a plurality of lugs 51f serving as hookers. At maintenance, suspenders suspended from a crane hook the corresponding lugs 51f.

Next, operation of the slag cyclone 9 with the structure described above will be described.

As illustrated in FIG. 2, a mixed fluid of slag and cooling water guided from the slag hopper 5 (refer to FIG. 1) is guided into the cyclone body 50 of the slag cyclone 9 from the downstream end 7a of the slag discharge line 7 through the slag discharge line 7.

The mixed fluid of slag and cooling water is whirled about the central axis of the cyclone body 50 in the cyclone body 50, so that the slag having larger specific gravity than the cooling water moves toward a peripheral sidewall surface (inner peripheral surface) of the cyclone body 50 with a centrifugal force, and then falls downward with gravity. At this time, although the slag moves downward while colliding with the inner peripheral surface of the cyclone body 50, the abrasion-resistant material 56 provided in the inner peripheral surface of the cyclone body 50 reduces abrasion of the cyclone body 50.

The slag centrifuged in the cyclone body 50 is discharged vertically downward from the opening 50d to be temporarily stored in the slag receiver 51d.

The cooling water centrifuged in the cyclone body 50 is discharged vertically upward through the cooling water outlet pipe 55. The cooling water guided from the cooling water outlet pipe 55 is returned into the slag hopper 5 through the water injection line 13 (refer to FIG. 1).

The slag stored in the slag receiver 51d is discharged to the outside, as described below.

Figure 3:
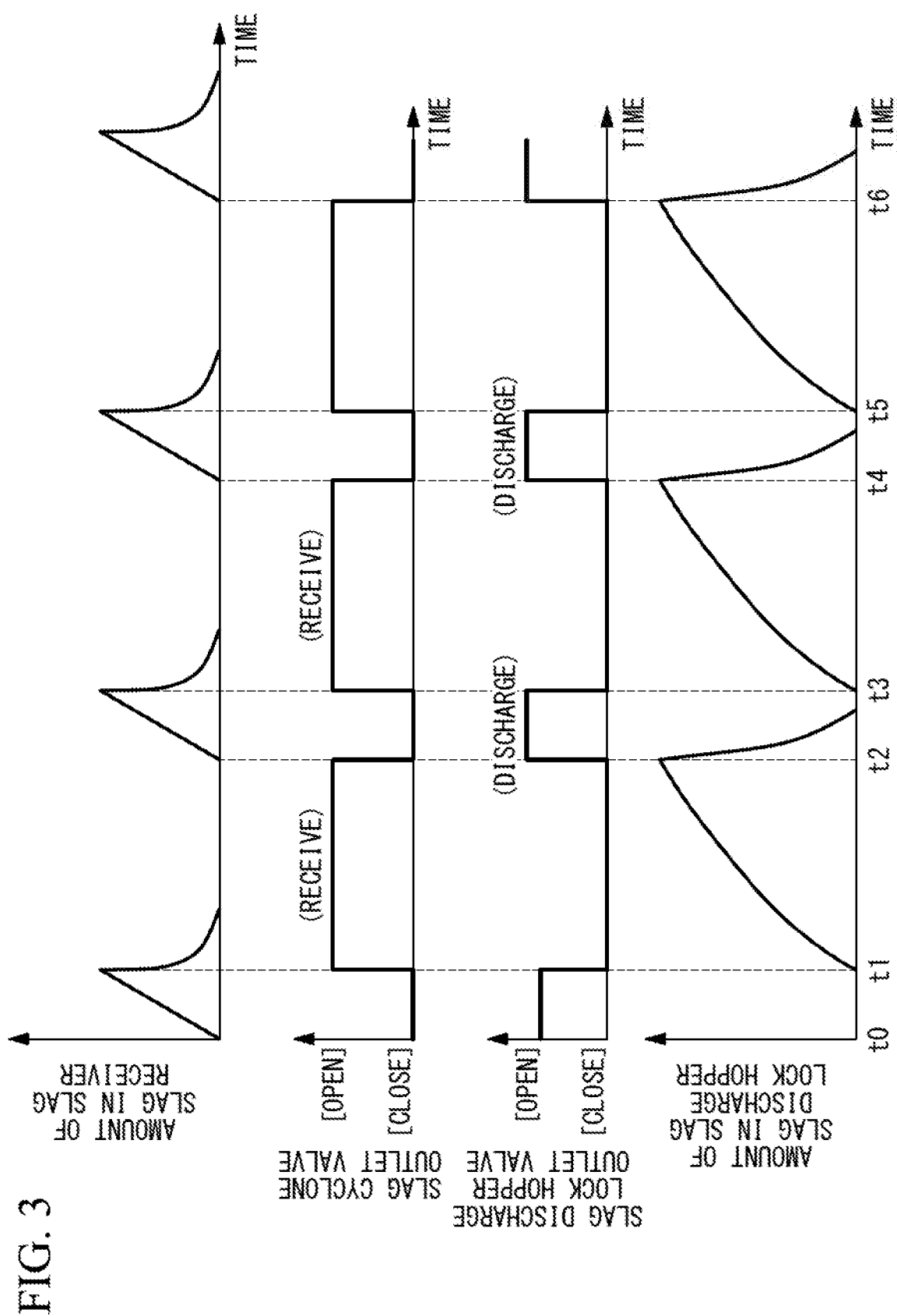
FIG. 3 is a timing chart illustrating operation of the slag cyclone of FIG. 2.

As illustrated in FIG. 3, when slag is stored in the slag receiver 51d, the slag cyclone outlet valve 20 is closed and the slag discharge lock hopper outlet valve 22 is opened, as in the period from time t0 to time t1. At this time, the slag discharge lock hopper outlet valve 22 is opened, slag in the slag discharge lock hopper 21 is discharged into the spin tub 25 (refer to FIG. 1). This causes the inside of the slag discharge lock hopper 21 to be atmospheric pressure. However, the slag cyclone outlet valve 20 is closed, so that a pressurized state is maintained in the pressure container 51.

While slag in the slag discharge lock hopper 21 is discharged into the spin tub 25 (refer to FIG. 1), slag is gradually stored in the slag receiver 51d. When the amount of stored slag reaches a specified value, or discharge of slag in the slag discharge lock hopper 21 is finished (time t1), the control unit (not illustrated) causes the slag cyclone outlet valve 20 to be opened and the slag discharge lock hopper outlet valve 22 to be closed. When the slag cyclone outlet valve 20 is opened, the slag S stored in the slag receiver 51d is fed by gravity to be received in the slag discharge lock hopper 21. This reduces the amount of slag in the slag receiver 51d, and increases the amount of slag in the slag discharge lock hopper 21. At this time, the slag discharge lock hopper outlet valve 22 is closed, so that the inside of the slag discharge lock hopper 21 becomes a pressurized state as with the pressure container 51. This prevents the inside of the pressure container 51 from being under atmospheric pressure.

When slag is gradually stored in the slag discharge lock hopper 21 and the amount of stored slag reaches a specified value (time t2), the control unit (not illustrated) causes the slag cyclone outlet valve 20 to be closed and the slag discharge lock hopper outlet valve 22 to be opened. The slag discharge lock hopper outlet valve 22 is opened, so that slag in the slag discharge lock hopper 21 is discharged into the spin tub 25 (refer to FIG. 1).

When slag is gradually stored in the slag receiver 51d and the amount of stored slag reaches a specified value or discharge of slag in the slag discharge lock hopper 21 is finished (time t3), the control unit (not illustrated) causes the slag cyclone outlet valve 20 to be opened and the slag discharge lock hopper outlet valve 22 to be closed. After this, the steps described above are repeated.

Next, a method for maintaining the slag cyclone 9 with the structure described above will be described.

While the inner peripheral surface of the cyclone body 50 is provided with the abrasion-resistant material 56, operation for a predetermined time or more causes the abrasion-resistant material 56 to be worn and a part thereof to be lost. This causes the inner peripheral surface of the cyclone body 50 to be damaged, so that the cyclone body 50 needs to be replaced. Then, while the pressure container 51 is as it is, only the cyclone body 50 is removed and replaced.

Figure 4A:
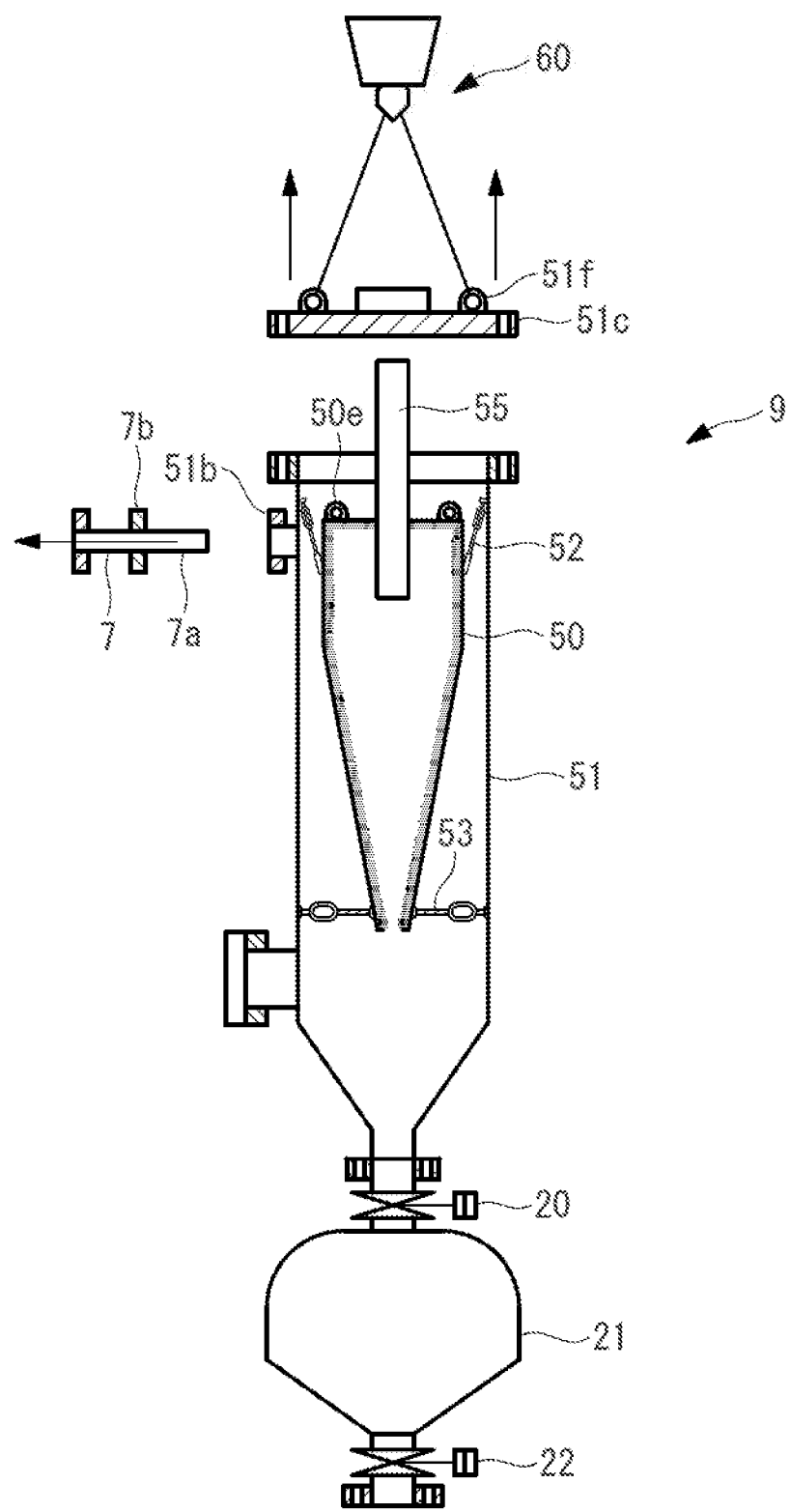
FIG. 4A illustrates a state where an upper lid is removed in a step of maintaining the slag cyclone of FIG. 2.

First, the downstream end 7a of the slag discharge line 7 is pulled and removed from the pressure container 51, as illustrated in FIG. 4A.

The lugs 51f provided in the upper lid 51c of the pressure container 51 are hooked by a suspender 60 of a crane so that the upper lid 51c is pulled up vertically upward to be removed from the body of the pressure container 51.

Figure 4B:
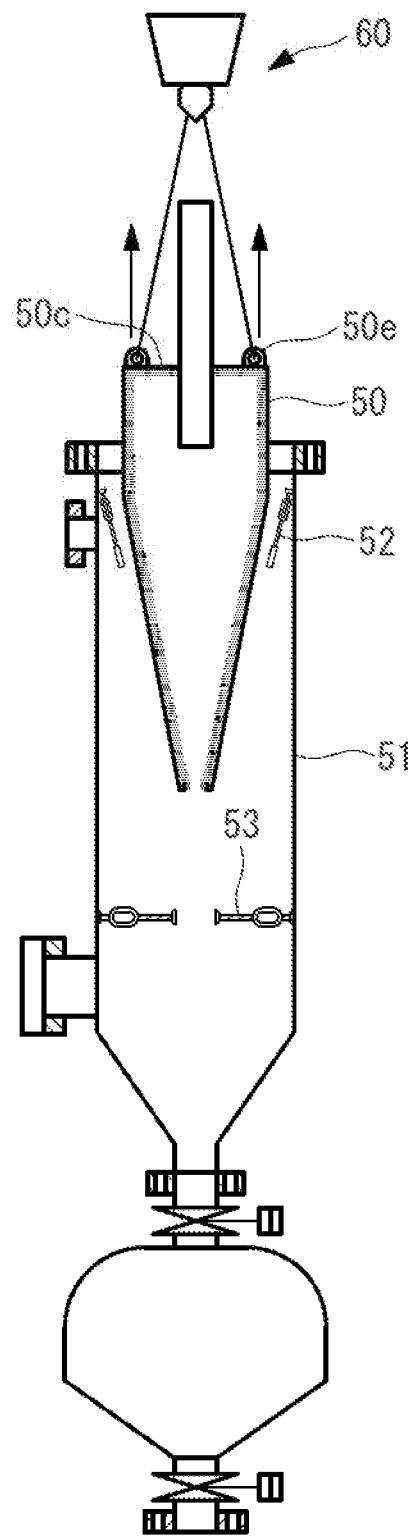
FIG. 4B illustrates a state where a cyclone body is suspended in the step of maintaining the slag cyclone of FIG. 2.

Next, the suspenders 52 and the support equipment 53 are removed from the cyclone body 50, and then the lugs 50e provided at the upper end 50c of the cyclone body 50 are hooked by the suspender 60 of the crane. Subsequently, the suspenders 52 and the support equipment 53 are unhooked, and the cyclone body 50 is pulled up vertically upward to be removed from the body of the pressure container 51, as illustrated in FIG. 4B.

Figure 4C:
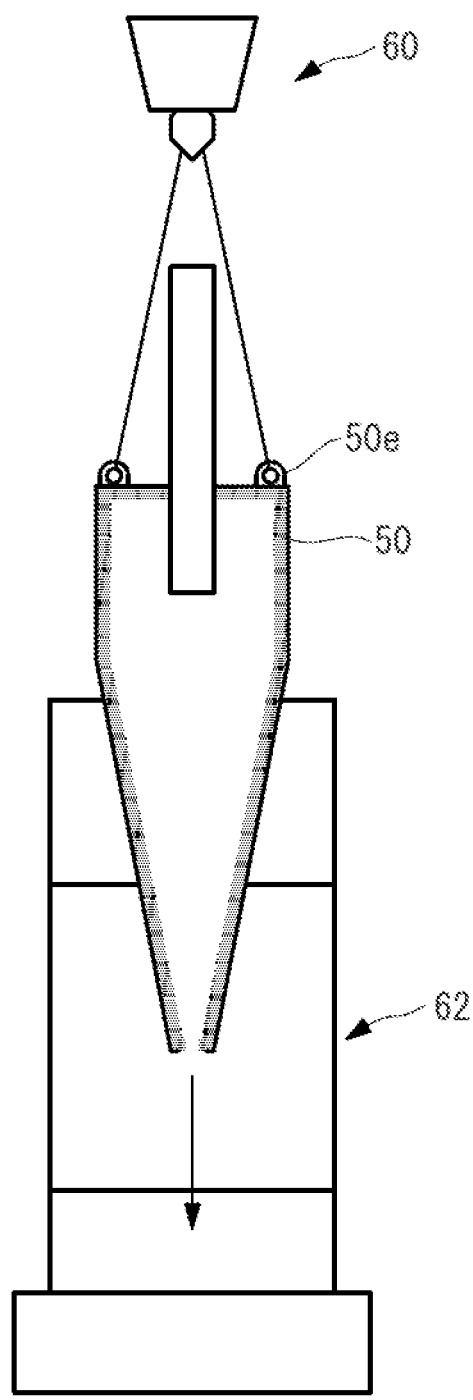
FIG. 4C illustrates a state where the cyclone body is being placed in a temporary placing stand in the step of maintaining the slag cyclone of FIG. 2.
Figure 4D:
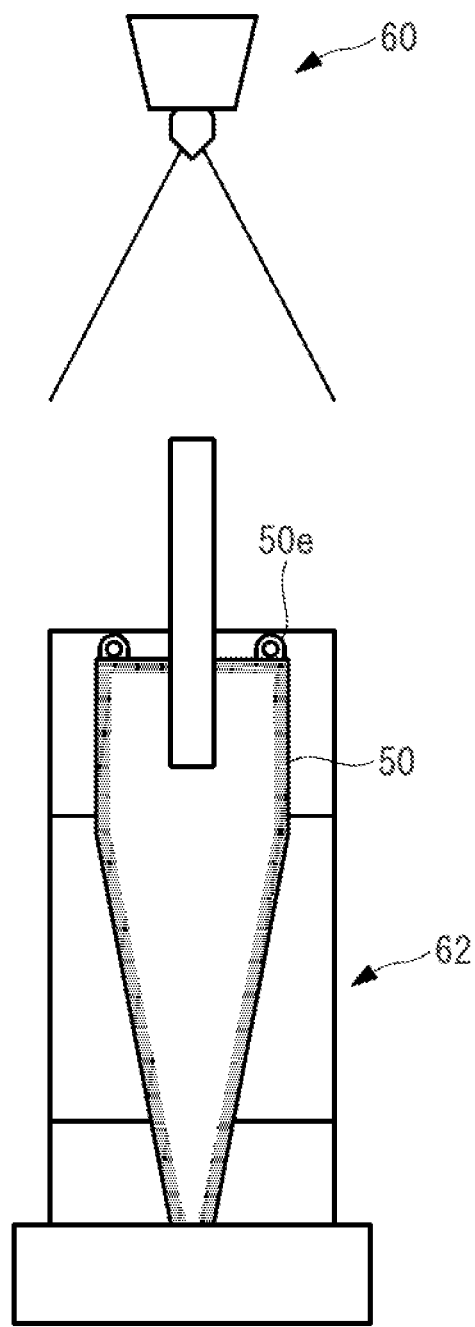
FIG. 4D illustrates a state of the cyclone body having been placed in the temporary placing stand in the step of maintaining the slag cyclone of FIG. 2.

Then, the cyclone body 50 removed is placed in the temporary placing stand 62, as illustrated in FIGS. 4C and 4D. Accordingly, removal of the used cyclone body 50 is finished.

Attachment of an unused cyclone body 50 is performed in inverse order in the step described above such that the unused cyclone body 50 is suspended by using the suspender 60 of the crane to be placed in the pressure container 51.

Figure 5A:
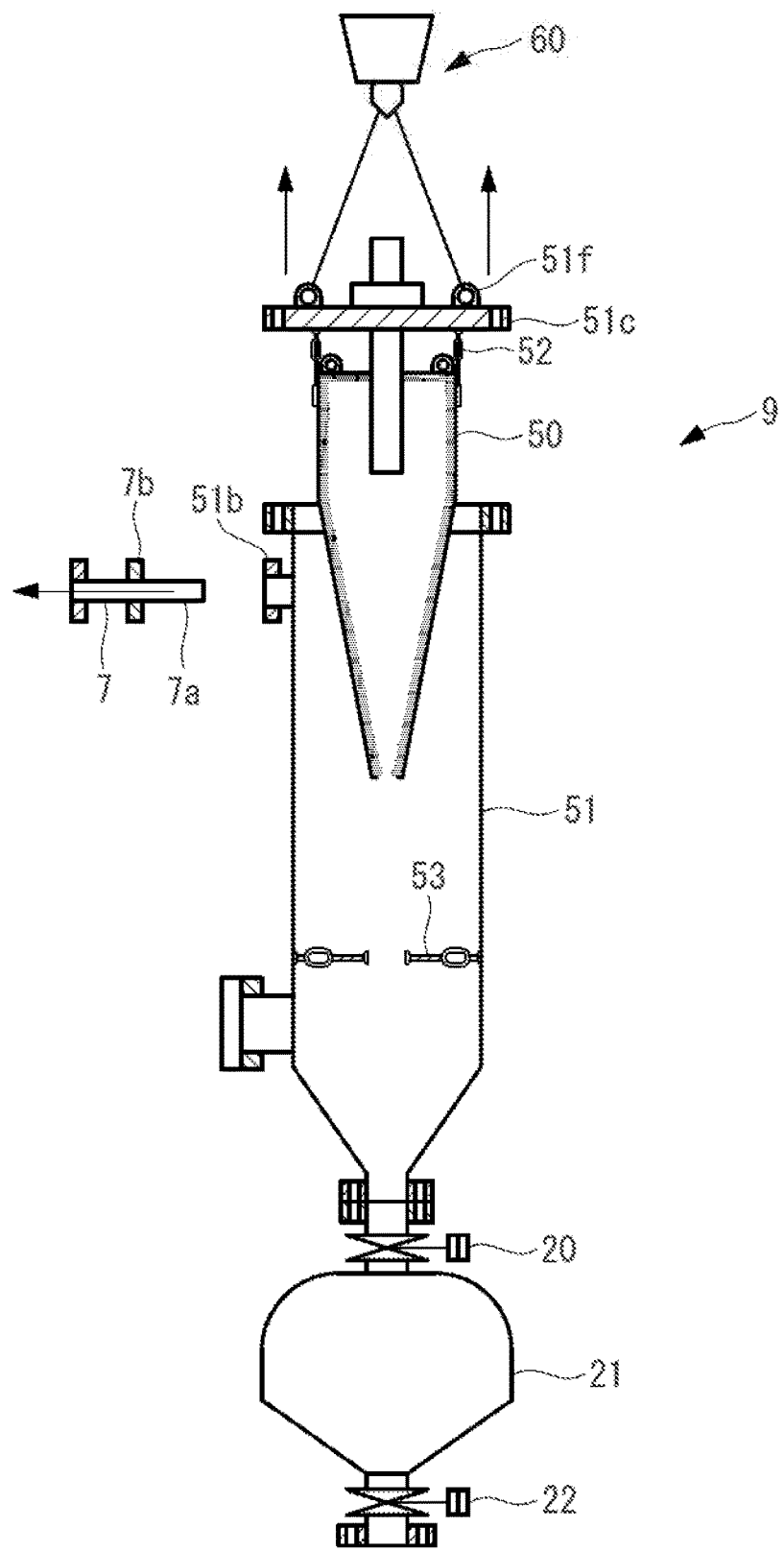
FIG. 5A illustrates a modification of the maintenance step of FIG. 4A.
Figure 5B:
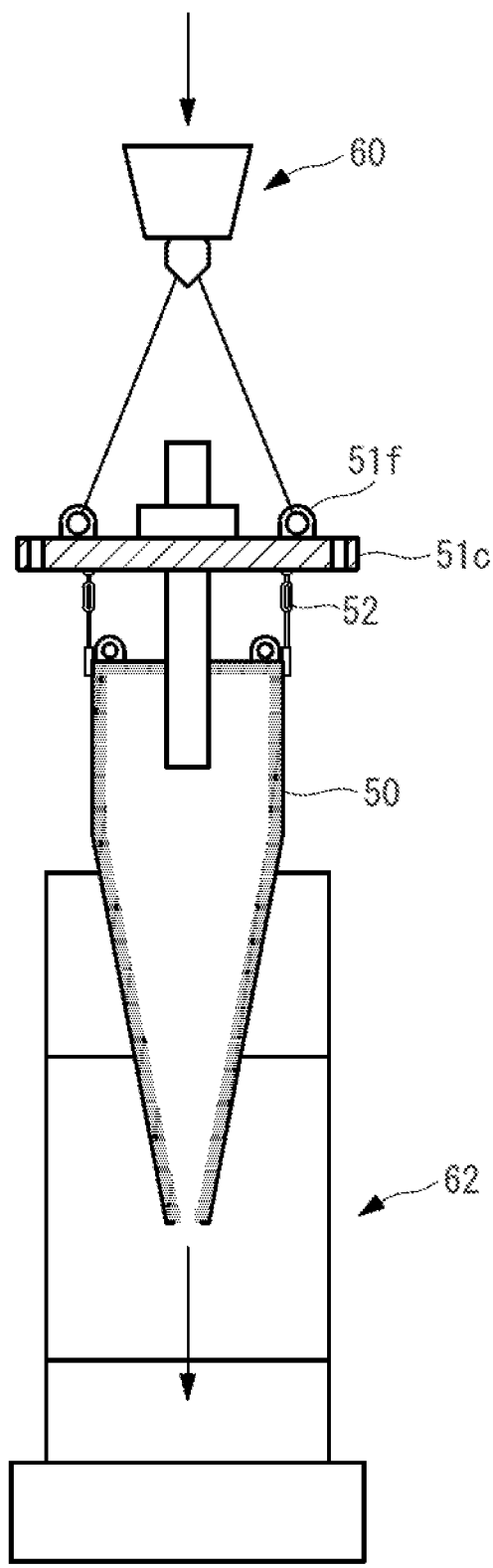
FIG. 5B illustrates a modification of the maintenance step of FIG. 4C.
Figure 5C:
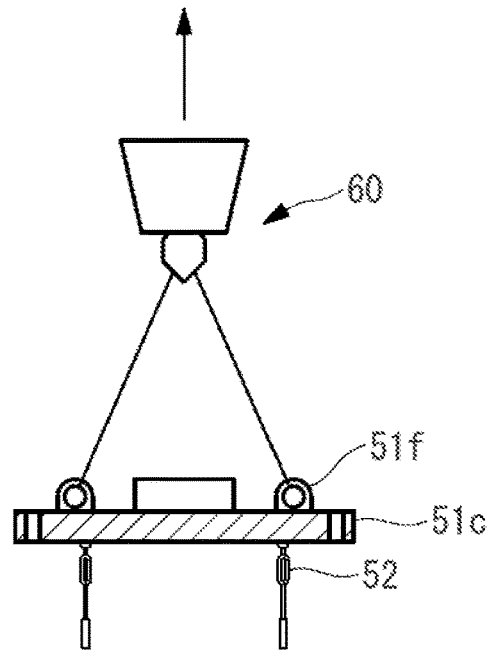
FIG. 5C illustrates a modification of the maintenance step of FIG. 4D.
Figure 5C:
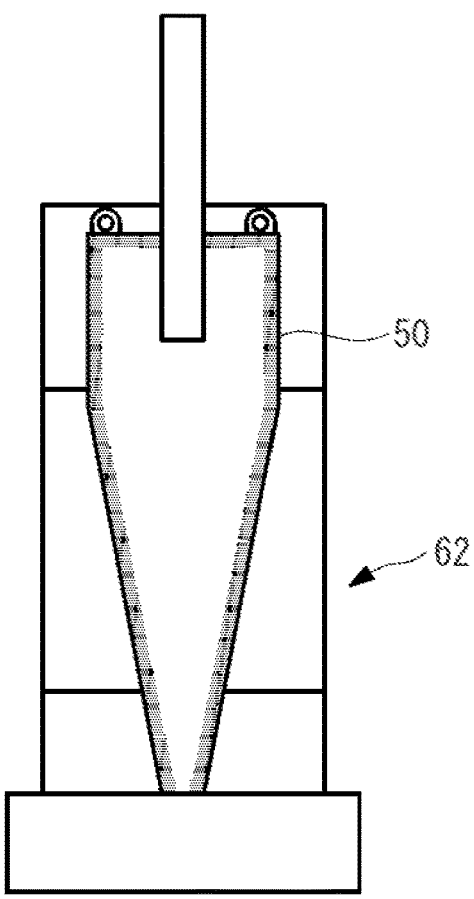

As illustrated in FIGS. 5A to 5C, the cyclone body 50 may be removed together with the upper lid 51c.

In this case, the cyclone body 50 is suspended from upper lid 51c using the suspenders 52, as illustrated in FIG. 5A. This point is different from the structure of FIG. 2 in which the other end of each suspender 52 is suspended from a side inner wall of the pressure container 51. However, the cyclone body 50 is similarly suspended from the pressure container 51.

As illustrated in FIGS. 5A to 5C, the cyclone body 50 can be removed together with the upper lid 51c, so that there is an advantage of allowing the suspender 60 of a crane to be maintained in a state of being attached to the lugs 51f of the upper lid 51c to eliminate the need to hook the suspender 60 on the lugs 50e of the cyclone body 50 when the cyclone body 50 is raised as illustrated in FIG. 4B. In addition, this allows operation outside the pressure container 51, so that there is an advantage of facilitating attachment and detachment of each suspender 52, and liquid-tightly sealing operation between the cooling water outlet pipe 55 and the upper lid 51c.

As described above, according to the present embodiments, the following operational effects are achieved.

The cyclone body 50 is disposed in the pressure container 51 to form a double structure to allow the opening 50d of the cyclone body 50 to open in the pressure container 51, so that the inside and the outside of the cyclone body 50 communicate with each other to cause pressure inside and outside the cyclone body 50 to be substantially identical to each other. Accordingly, there is no large difference in pressure inside and outside the cyclone body 50, so that the cyclone body 50 does not need to employ a pressure-resistant structure. This enables the cyclone body 50 to be reduced in thickness as well as in weight and cost even when a pressurized mixed fluid is centrifuged. The cyclone body 50 is reduced in weight as described above, so that operation of removing the pressure container 51 from the cyclone body 50 at maintenance is facilitated.

The slag receiver 51d is provided integrally with the pressure container 51, so that slag discharged from the cyclone body 50 can be temporarily stored. This eliminates the need to provide a bottle for temporarily storing slag outside the pressure container 51 to enable structure to be simple.

When the slag discharge lock hopper 21 is provided vertically below the pressure container 51 and the slag cyclone outlet valve 20 and the slag discharge lock hopper outlet valve 22 are switched, slag stored in the slag receiver 51d under pressure can be discharged into an atmosphere side.

The cyclone body 50 is suspended from the pressure container 51 with the suspenders 52, so that the cyclone body 50 can be easily removed to the outside of the pressure container 51 with a suspender 60 of a crane.

The downstream end 7a of the slag discharge line 7 is detachably inserted into the pressure container 51 and the cyclone body 50, so that the slag discharge line 7 can be easily separated from the cyclone body 50 by pulling the downstream end 7a of the slag discharge line 7 from the cyclone body 50 when the cyclone body 50 is removed from the pressure container 51.

The slag discharge line 7 also can be inserted from the outside of the pressure container 51 to improve workability when being assembled.

In addition, the pressure container 51 is configured to be sealed at the outside thereof with the connecting flanges 7b and 51b, so that assembly and sealing can be performed at the same time outside the pressure container 51 to further improve workability.

The embodiments described above each are described as the slag cyclone 9 used for coal gasification-combined power generation equipment, and may be used for plants other than the coal gasification-combined power generation equipment 10, or for the slag cyclone 9 of a chemical plant, for example.

While coal is used as fuel in the embodiments described above, even high-grade coal and low-grade coal can be used, the fuel is not limited to coal. Biomass used as renewable biological organic resources may be used, and thinned wood, waste wood, driftwood, grass, waste, sludge, tire, and recycle fuel (pellet or tip) using them as raw material, etc. may be used, for example.

The embodiments described above each are described for a tower-type gasification furnace, and can be similarly applied to a crossover-type gasification furnace as the gasification furnace.

REFERENCE SIGNS LIST 3 gasification furnace
3a inner container (gasification furnace wall)
3b outer container (gasification furnace pressure container)
3c combustor
3d reductor
5 slag hopper
7 slag discharge line (mixed-fluid feeding pipe)
7a downstream end
7b connecting flange
9 slag cyclone
11 slag cyclone inlet valve
13 water injection line
15 slag hopper water injection valve
17 strainer
19 water injection pump
20 slag cyclone outlet valve (pressurized-side on-off valve)
21 slag discharge lock hopper
22 slag discharge lock hopper outlet valve (atmosphere-side on-off valve)
23 distributor
25 spin tub
39 slag intake
40 water outlet
50 cyclone body
50a tube portion
50b taper portion
50c upper end
50d opening (slag exhaust port)
50e lug
51 pressure container
51a connecting pipe
51b connecting flange
51c upper lid
51d slag receiver
51e manhole part
51f lug
52 suspender
53 support equipment
55 cooling water outlet pipe
56 abrasion-resistant material
60 suspender
62 temporary placing stand
G installation face

The invention claimed is:

1. A slag cyclone comprising:
a cyclone body into which a pressurized mixed fluid of slag and liquid is guided to centrifuge the slag from the liquid,
a pressure container for housing the cyclone body,
a connecting pipe provided in the pressure container,
a first flange provided at an end of the connection pipe,
a mixed-fluid feeding pipe for guiding the mixed fluid into the cyclone body, and
a second flange provided in the mixed-fluid feeding pipe,
the cyclone body being provided in its vertically lower portion with a slag exhaust port opening in the pressure container,
the mixed-fluid feeding pipe being detachably insertable into the pressure container and the cyclone body from the outside of the pressure container,
with the first flange and the second flange connected to each other in a state where the mixed-fluid feeding pipe is inserted into the pressure container and the cyclone body, the mixed-fluid feeding pipe being sealed for the pressure container in a liquid-tight condition,
the cyclone body having an inner peripheral surface to which an abrasion-resistant material is applied, and
the abrasion-resistant material becoming thicker toward the slag exhaust port opening.

2. The slag cyclone according to claim 1, wherein
the pressure container includes a slag receiver for temporarily storing slag, provided vertically below the slag exhaust port of the cyclone body.

3. The slag cyclone according to claim 2, further comprising:
a slag-discharge lock hopper for receiving slag from the slag receiver, provided below the pressure container;
a pressurized-side on-off valve provided between the slag-discharge lock hopper and the slag receiver; and
an atmosphere-side on-off valve provided between the slag discharge lock hopper and a transfer destination on an atmosphere side.

4. The slag cyclone according to claim 1, wherein
the cyclone body is supported by being suspended from the pressure container with a plurality of suspenders.

5. The slag cyclone according to claim 4, wherein
a support equipment is provided between the cyclone body and the pressure container to define a horizontal position of the cyclone body.

6. Gasification equipment comprising:
a gasification furnace apparatus that produces produced gas by using combustion and gasification of carbon-containing solid fuel; and
the slag cyclone according to claim 1 that centrifuges slag produced by the gasification furnace apparatus from liquid.

7. Gasification-combined power generation equipment comprising:
a gasification furnace apparatus that produces produced gas by using combustion and gasification of carbon-containing solid fuel;
the slag cyclone according to claim 1 that centrifuges slag produced by the gasification furnace apparatus from liquid;
a gas turbine that is rotationally driven by burning at least a part of the produced gas produced by the gasification furnace apparatus;
a steam turbine that is rotationally driven by steam including steam produced by an exhaust heat recovery boiler for receiving turbine exhaust gas discharged from the gas turbine; and
a generator coupled to the gas turbine and the steam turbine.

8. A method for operating the slag cyclone according to claim 1, the method comprising the steps of:
injecting a pressurized mixed fluid of slag and liquid into a cyclone body housed in a pressure container to centrifuge the pressurized mixed fluid; and
discharging centrifuged slag into the pressure container from a slag exhaust port of the cyclone body.

* * * * *